(12) United States Patent
Teodorovich et al.

(10) Patent No.: US 12,098,543 B2
(45) Date of Patent: Sep. 24, 2024

(54) APPARATUS AND METHOD FOR EXPOSED INSULATED WALLBOARD

(71) Applicants: Mishko Teodorovich, Austin, TX (US); Andrew Teodorvich, Austin, TX (US)

(72) Inventors: Mishko Teodorovich, Austin, TX (US); Andrew Teodorvich, Austin, TX (US)

( * ) Notice: Subject to any disclaimer, the term of this patent is extended or adjusted under 35 U.S.C. 154(b) by 75 days.

(21) Appl. No.: 17/628,327

(22) PCT Filed: Aug. 3, 2020

(86) PCT No.: PCT/US2020/044714
§ 371 (c)(1),
(2) Date: Jan. 19, 2022

(87) PCT Pub. No.: WO2021/026058
PCT Pub. Date: Feb. 11, 2021

(65) Prior Publication Data
US 2022/0282477 A1    Sep. 8, 2022

Related U.S. Application Data

(60) Provisional application No. 62/882,522, filed on Aug. 3, 2019.

(51) Int. Cl.
*E04B 1/76* (2006.01)
*B32B 15/20* (2006.01)
(Continued)

(52) U.S. Cl.
CPC ............. *E04B 2/707* (2013.01); *B32B 15/20* (2013.01); *E04B 1/7608* (2013.01);
(Continued)

(58) Field of Classification Search
CPC ...... E04B 2/707; E04B 1/7608; E04B 2/7412; E04B 2/7457; E04B 2103/04; B32B 15/20
See application file for complete search history.

(56) References Cited

U.S. PATENT DOCUMENTS 3,336,709 A * 8/1967 Berney ................... E04C 2/384
52/309.3
3,570,199 A * 3/1971 Gartner ................ E04B 2/7403
52/168

(Continued)

FOREIGN PATENT DOCUMENTS

EP          3045306 A1 * 7/2016 ............. B32B 27/12
KR       101331396 B1 * 11/2013 ............... E04B 1/80

*Primary Examiner* — Brent W Herring
(74) *Attorney, Agent, or Firm* — Rick B. Yeager

(57) ABSTRACT

Insulated wallboards are exposed interior insulation panels, for walls and ceilings, in occupiable spaces, that can be taped, finished, textured, and painted, which eliminates the need for gypsum board, and reduces or eliminates the need for other insulation, such as wall cavity insulation and exterior insulation. Insulated wallboard panels are formed by applying various combinations of thermal reflection layers such as aluminum foil; moisture resistance layer; or reinforcement layers over an insulating core. An enhanced surface or enhanced surface layer is provided on the interior-facing surface of the panel, to accept joint compound, paint, plaster, texture, or other interior finish. The core may be phenolic or other material with appropriate insulating and fire-retardant properties. The insulated wallboards may be applied directly to wood or metal framing, masonry, CMU, tilt-up concrete walls; or over existing gypsum board or other interior surfaces to retrofit additional insulation without disrupting exterior walls or roof.

14 Claims, 12 Drawing Sheets

(51) Int. Cl.
*E04B 2/70* (2006.01)
*E04B 2/74* (2006.01)
*E04B 1/41* (2006.01)

(52) U.S. Cl.
CPC .......... *E04B 2/7412* (2013.01); *E04B 2/7457* (2013.01); *E04B 1/4178* (2013.01); *E04B 2103/04* (2013.01)

(56) References Cited

U.S. PATENT DOCUMENTS

| | | | | |
|---|---|---|---|---|
| 4,034,528 A * | 7/1977 | Sanders | ................. | E04D 3/352 52/404.4 |
| 4,292,369 A * | 9/1981 | Ohashi | ................. | B32B 5/245 428/920 |
| 4,296,170 A * | 10/1981 | Ohashi | ................. | B32B 27/20 428/920 |
| 5,220,760 A * | 6/1993 | Dimakis | ................. | E04C 2/296 428/536 |
| 5,758,464 A * | 6/1998 | Hatton | ................. | E04B 1/7675 52/510 |
| 7,141,768 B2 * | 11/2006 | Malofsky | ............ | B29C 65/3644 428/458 |
| 10,731,341 B2 * | 8/2020 | Lambach | ................. | E04B 5/02 |
| 2002/0031644 A1 * | 3/2002 | Malofsky | ................. | C09J 5/06 428/355 R |
| 2005/0252128 A1 * | 11/2005 | Colbert | ................. | E04F 13/04 52/344 |
| 2006/0230707 A1 * | 10/2006 | Roe | ................. | E04D 13/172 52/794.1 |
| 2007/0004306 A1 * | 1/2007 | Leeser | ................. | E04B 1/625 442/131 |
| 2009/0308001 A1 * | 12/2009 | Wu | ................. | E04F 13/0885 52/173.3 |
| 2010/0071292 A1 * | 3/2010 | Futterman | ............ | E04F 13/042 52/412 |
| 2012/0021172 A1 * | 1/2012 | Willson | ................. | B32B 13/06 428/688 |
| 2015/0047281 A1 * | 2/2015 | Cole | ................. | E04C 2/246 52/302.1 |
| 2016/0361892 A1 * | 12/2016 | Ciuperca | ................. | E04B 1/762 |
| 2017/0328064 A1 * | 11/2017 | Hill | ................. | E04C 2/44 |
| 2017/0368792 A1 * | 12/2017 | Faotto | ................. | B32B 5/18 |
| 2020/0141115 A1 * | 5/2020 | Lambach | ............. | B32B 15/046 |
| 2020/0408471 A1 * | 12/2020 | Zhang | ................. | E04B 1/7608 |
| 2021/0396010 A1 * | 12/2021 | Rudisill | ................. | E04D 3/355 |

\* cited by examiner

APPARATUS AND METHOD FOR EXPOSED INSULATED WALLBOARD

This PCT application is related to U.S. Provisional application No. 62/882,522 filed Aug. 3, 2019 by applicants and claims the priority date of that application.

BACKGROUND

Field of Invention

The current invention relates to an apparatus and method for insulated wallboard. More particularly, the invention relates to an apparatus and method for applying an exposed insulated, finishable wallboard to the interior faces of walls or ceilings in occupiable and non-occupiable spaces.

Prior Art

Current construction practices include wall cavity insulation and exterior insulation sheathing. Providing insulation inside a wall cavity between wall studs, such as with fiberglass, cellulose, rock wool, in batt, blanket or blown form, rigid or spray foam, is referred to as wall cavity insulation. Providing insulation on the exterior side of exterior sheathing, or on the exterior side of the wall studs, such as insulated sheathing, fiberglass, or spray foam insulation, is referred to as exterior insulation. A drawback of exterior insulation is that to meet an R13 minimum insulation requirement, the exterior insulation needs to be, typically, at least 2" thick, unless cavity insulation is present. This thickness adds additional cost and complexity to waterproofing, flashing, and installing exterior cladding. Cladding such as brick, stone, stucco, siding, typically requires rigid sheathing, or wood studs to attach masonry ties to, therefore penetrating exterior insulation and increasing the risk of water leaks and thermal bridging. Installing window and door fasteners and masonry ties through exterior insulation, also reduces the R value of exterior insulation and creates thermal bridging.

Both wall cavity insulation and exterior insulation inhibit drying of the wall cavity from any potential leaks or excessive moisture, and thus stimulates water damage and microbial growth. Thicker insulation, as required in many areas, aggravates the moisture and mold issues.

Current practices teach if insulating layer is used on the interior of the building, such as rigid foam insulated sheathing, a layer of gypsum board should be used over the rigid foam, for the purpose of thermal barrier and as a finish surface for paint and texture.

Various insulating wallboard structures and methods are presented in prior art. The prior art for insulating foam sheathing typically relates to foil-faced exterior wallboard which is used in conjunction with an insulated interior wall cavity insulation. The prior art methods typically require wall cavity insulation, exterior insulation, or both. This is because adding a reflective sheet material such as metal foil to wallboard and providing an air gap between wallboard and wall cavity insulation, is not enough to provide a sufficient thermal resistance (R Value) required by current building codes. Additional insulation is required to satisfy building codes.

The prior art does not appear to describe wallboard structures and installation methods that can be used without wall cavity insulation; and does not appear to suggest methods of insulating the interior faces of external wall studs with insulated wallboard that is exposed to interior occupiable space.

In some prior art applications, a rigid foam sheathing is applied over CMU or concrete walls. For example, Thermax™ foil-faced, polyisocyanurate insulated sheathing, may be left exposed in storage and utility areas such as crawl spaces, attics and basements. The manufacturer recommends applying a code approved finish where necessary to protect the insulation from damage or standing water.

Per Thermax installation instruction, if a finished wall is desired, gypsum wallboard or paneling should be installed by attaching gypsum or panels to furring strips (nailers) at the top and bottom, or attaching gypsum to furring strips installed over Thermax sheathing, or framing a wall next to Thermax sheathing and attaching the gypsum to the wall. It is necessary to add a layer of gypsum sheathing, and in some cases a furring strip or a framed wall and gypsum sheathing, on the interior side of the Thermax sheathing in occupiable space. The reason to add gypsum sheathing is that most insulated sheathing, such as traditional polystyrene, and polyisocyanurate, need to be separated by a thermal barrier from the occupiable space and are not designed for enhancement such as paint or drywall compound directly applied to insulated sheathing.

In another example, Kingspan Kooltherm K9™ is a phenolic "internal insulation board" with a phenolic core faced on both sides with a glass tissue based facing cover. It was advertised for "Internal Insulation Board for Basements/Crawlspaces Wall Application", to exclude thermal and ignition barriers in attics and crawl spaces, in accordance with NFPA 286. A thermal barrier was required for habitable spaces. There does not appear to be any suggestion for applying a finished surface, or for using the product exposed in habitable spaces.

SUMMARY OF INVENTION

The use of exposed insulated wallboard comprising a rigid foam insulative core and an enhanced surface that accepts joint compound, paint, texture, plaster, or other finish, eliminates the need to install gypsum board either as a thermal barrier or as a finishable surface, such as paint, texture or other. In some examples, high thermal performance insulation is used, thereby saving space, and allowing for reduced or omitted wall cavity insulation. This enables the most cost-effective use of interior insulation and provides many benefits and advantages for both new construction and retrofit. The reduced lumber use, and omission of gypsum board, furring strips, and wall framing, preserves natural resources and supports more sustainable building practices.

In new construction embodiments, a fire retardant insulated wallboard assembly, "insulating sheathing", having an insulated core and an enhanced surface is applied to the interior faces of "structural elements" such as wood or metal wall studs; wood or metal ceiling joists or roof rafters; trusses; poured or tilt-wall concrete walls; or concrete masonry units. Wall cavity insulation and exterior insulation can be eliminated or reduced while still meeting code requirements for exterior wall insulation of R13 or higher.

Examples of insulating core include thermoset materials such as phenolic board, polyisocyanurate (polyiso), non-thermostat polymers such as polystyrene, mineral insulation such as rockwool boards, glass insulation such as fiberglass, and green insulation materials such as hemp boards, or recycled cellulose.

The enhanced surface permits the insulating sheathing to be left exposed and finished as desired, without the application of gypsum sheathing. This embodiment provides high resistance to water damage and microbial growth, due to absence of materials prone to water absorption, water damage and microbial growth, such as gypsum core and paper faced gypsum board.

In some examples, the insulating core has an R-value of R5, or greater, per inch. A phenolic thermoset insulating core has an R-value of R8 per inch or higher. The high R-value of the insulating core improves the "R value" of walls and ceilings. For instance, fiberglass batt insulation has an R value of about 3.5 per inch, so a 3.5" deep wall cavity between 2×4" studs provides a total R value of about R13 which does not meet a typical R15-R21 code requirement for walls because gypsum sheathing adds only about R0.45-R0.56. This deficiency is usually addressed by adding a layer of insulation on the exterior side of the studs. Another approach is to use 2×6" studs to increase the wall cavity insulation thickness by 2" and increase R to R20. In one example of interior insulation, a 2" thick phenolic core provides about R16, with R29 for the total wall insulation when combined with wall cavity insulation. Adding 1" phenolic insulated sheathing on the interior side, with R8 per inch, would provide total wall insulation R21, which meets code requirements without exterior insulation. In some examples, additional layers, such as aluminum foil, and or enhanced surface layer, may be applied to one or both sides of the core layer.

Another advantage to interior insulation is the reduction or elimination of thermal bridging. Framing lumber, or metal framing studs, are a better conductor than fiberglass insulation, or other wall cavity insulation such as cellulose, sprayed foam, rigid foam, and other, so the studs bleed heat through the wall assembly. In commercial construction, the use of metal studs is common. Metal studs have high thermal conductivity and therefore make wall cavity insulation much less effective due to "thermal bridging" by metal framing and structural members between interior gypsum wallboard and the exterior of the building. Gypsum wallboard has R value typically R0.4-R0.6, and is not considered an insulating material, so any thermal bridging is passed directly to the interior space. The method of interior insulation reduces or eliminates the problem with thermal bridging by applying the insulation on the interior side of exterior walls and ceilings.

Another advantage is that remediation after flood damage with insulated wallboard is less expensive than the removal and disposal of gypsum sheathing and wall cavity insulation.

In another embodiment, insulated sheathing is attached to wall studs, or to ceiling joists, over existing gypsum wallboard, and is left exposed. This method of applying additional interior insulation can be substantially more efficient and practical, than removing exterior cladding or shingles in order to place exterior insulation. This approach provides a retrofit method for adding interior insulation to an existing building.

STANDARDS REFERENCES

In one embodiment, insulated wallboard meets national fire codes or relevant fire tests in the country of use. In the US, relevant fire tests are ASTM E84 and NFPA 286. In Canada, relevant fire tests are CAN/ULC S102 and CAN/ULC-S127.

DESCRIPTION OF EMBODIMENT

Definitions

Figure 1:
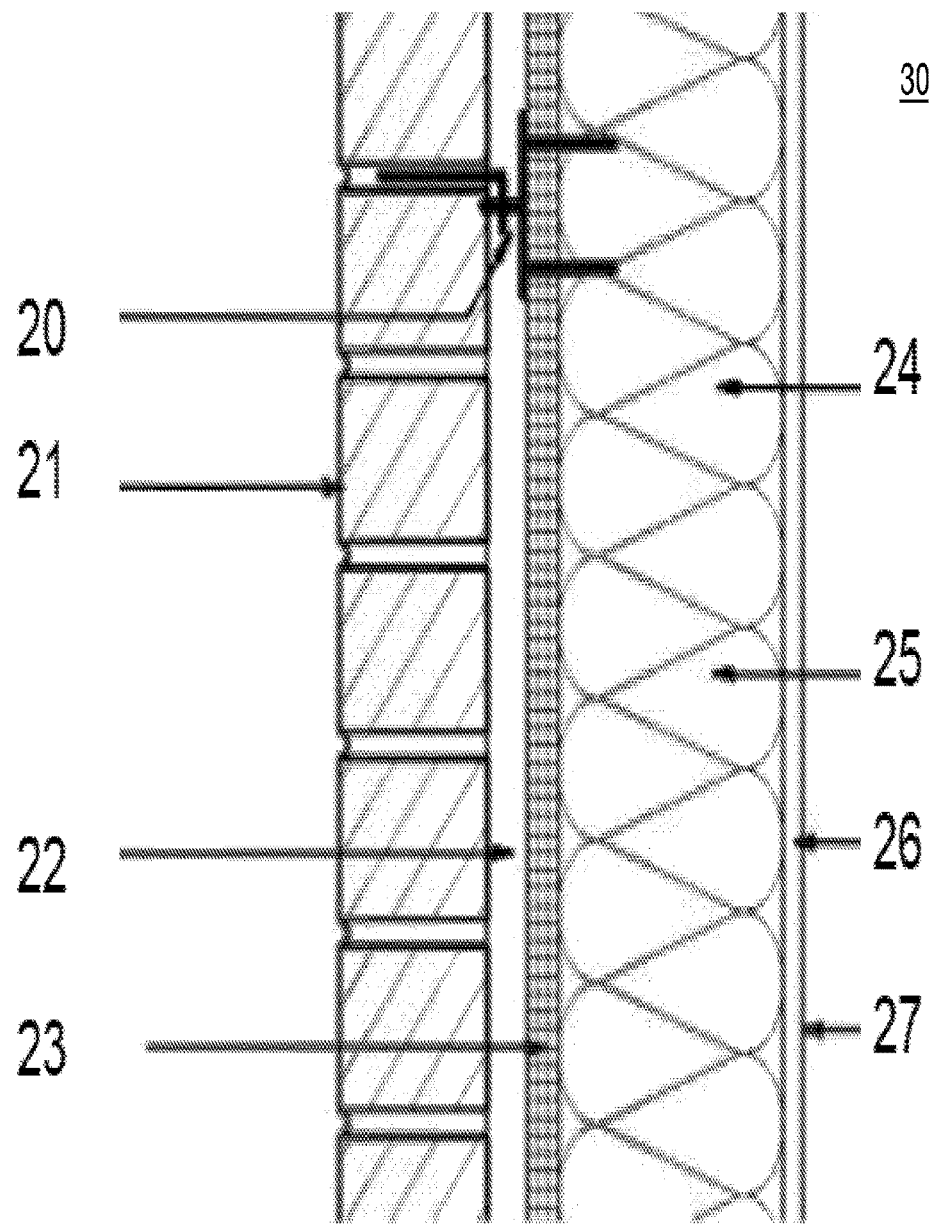
FIG. 1 (PRIOR ART) is a cross section view of a prior art wall.

The following definitions apply to this specification and to the claims.

The term "wallboard" means a rigid panel that may be applied to the interior walls or ceiling of a structure. One prior art example of wall board is gypsum board, which is made in ½" thickness for walls, and ⅝" thickness for ceilings. The term "insulated wallboard" means a wallboard with insulating properties typically equal or higher then R5 per inch, and which comprises an insulating core with a material such as a phenolic, extruded polystyrene, expanded polystyrene, polyiso, or foil-faced polyisocyanurate, or non-foil-faced polyisocyanurate material, fiberglass, cellulose, hemp, where the material provides a higher insulating value than gypsum board. The terms "cavity side" or "exterior side" refers to the face of the insulated sheathing which will be applied to the studs, and the term "interior side" refers to the face of the insulated sheathing which will face the interior of a room.

The terms "insulated core" or "insulating core" means a core insulating material layer with higher insulating properties than a gypsum board, with an insulating value, typically equal to or higher than R5 per inch. In some embodiments of the current invention, phenolic is used as an insulating core. The terms "insulated sheathing" or "insulated sheets" means a panel having an insulating core with acceptable insulation properties, typically with at least R5 per inch. Trade names for prior art insulated sheathing are: Styrofoam™, Polyiso™, and Polyisocyanurate, RMax™, Thermax Sheathing™ (foil-faced), and similar.

The term "occupiable space" means any enclosed space inside a structure which is intended for human activities, including, but not limited to all habitable spaces, toilets, halls, laundry areas, closets, and other storage and utility areas.

The term "exposed wallboard" means an insulated wallboard configured to be used either without an interior-facing surface coating, or to accept paint, painting primer, drywall compound, or other types of coatings, or layers such as wall paper, exposed to occupiable space, so that neither a layer of gypsum board nor other thermal barrier is necessary.

The term "enhanced surface" includes both a chemical or mechanical treatment applied directly on the insulating core or applied to a foil layer over the insulated core; or to a separate "enhanced surface layer" such as a non-woven polypropylene, fiberglass-mat facing, epoxy coated aluminum foil, a spray on treatment, a chemically or mechanically treated facer; or another surface suitable for finishes. In one example, a paint with good adhesion to metal surfaces such as PPG Break-Through™ may be applied over a foil layer. The enhanced surface or enhanced surface layer provides a surface suitable for applying one or more of drywall compound, texture, paint primer, paint, plaster, or other interior finishes directly on the interior-facing side of the insulating sheathing. The term "non-woven fabric" means a layer of non-woven polypropylene, or other fabric, provided as enhanced surface interior finishes, such as paint, paint primer, joint compound, wallpaper or other finishes.

The terms "phenolic" or "phenolic material" refers to a material comprising any of the class of thermosetting resins formed from a phenol, or from a phenol derivative. A phenolic material typically provides the highest R value of thermoset resins, currently up to R8.5 per inch.

The term "cover layer" applies to either or both an "exterior cover layer" provided on the exterior-facing portion of an insulated sheet or an "interior cover layer" provided on the interior-facing portion an insulated sheet. One use of a cover layer is to provide better adhesion of aluminum foil thermal reflectance layers to an insulating core.

In this specification, the term "reinforcing layer" means a layer such as glass or fiberglass, for increasing structural or fire properties of the insulated wallboard.

The terms "interior face offset" and "exterior face offset" means an edge profile that permits overlapping edges, or "shiplap" assembly.

The term "cathedral ceiling" or "vaulted ceiling" means a ceiling surface on the underside of roof rafters, typically a sloped ceiling surface.

Prior Art Construction

Prior art exterior walls and ceilings which are exposed to the exterior or attic space are typically insulated by inserting wall cavity insulation between studs or joists, or by attaching insulation over exterior wallboard, such as fiberglass, rigid sheathing, or similar. With current practices, substantial portion of the cost of insulating the home or other building is the installation labor because it is a separate trade, and a separate sequence in the construction process.

FIG. 1 (PRIOR ART) is a cross section view of a prior art exterior wall 30. In this example, wall studs 24, such as 2"×4" or 2"×6" wood framing support an exterior sheathing 23 such as 7/16" OSB, or insulated foam sheathing, and an interior 0.5" Gypsum Board 26. Cavity insulation 25, such as fiberglass insulation is provided between studs. An interior finish 27, such as tape and floated wall compound and paint is applied to the Gypsum Board. In this example, brick masonry non-structural veneer 21 is held in place by masonry tics 20 secured to the exterior sheathing and studs. A 1" vented space 22 is provided between the brick veneer and the exterior sheathing.

Figure 2:
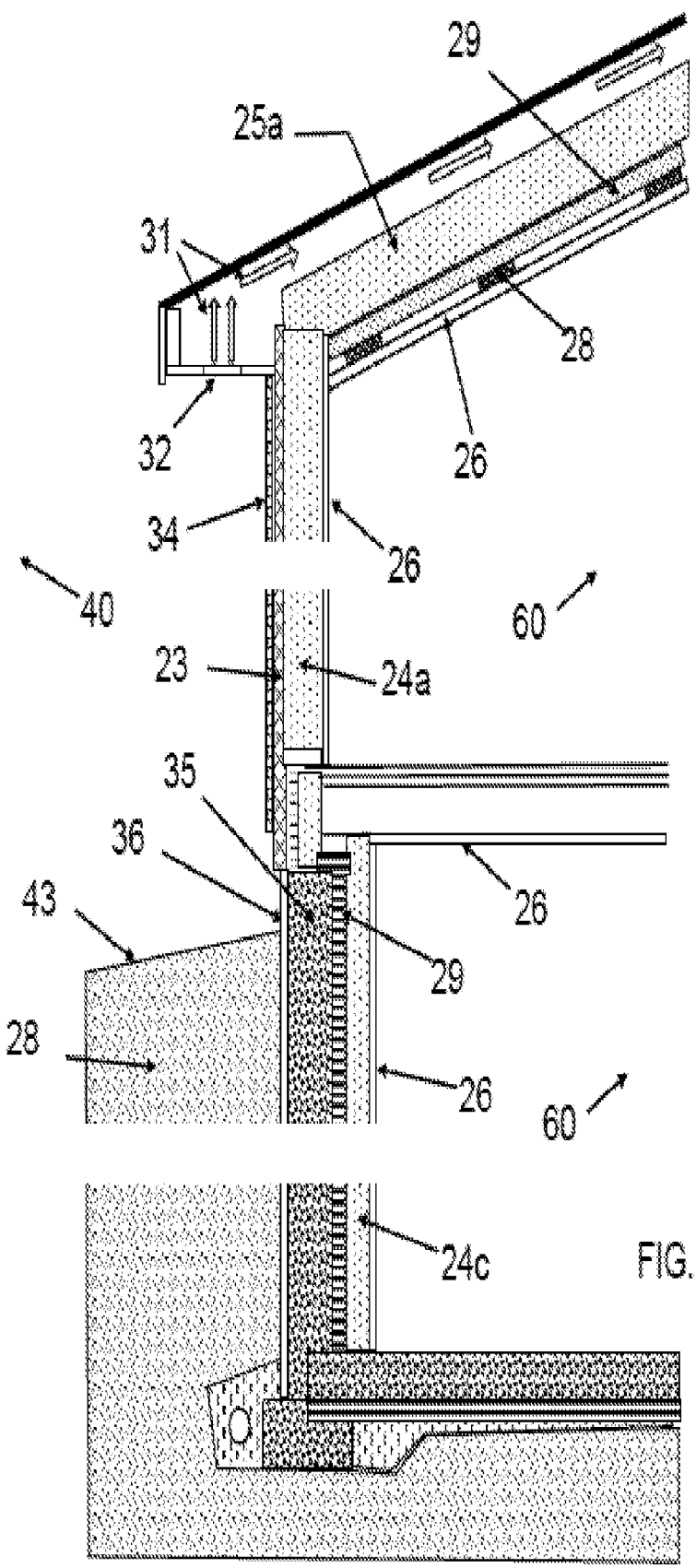
FIG. 2 (Prior Art) is a cross section of a typical residential prior art construction of walls and ceilings with wood studs and ceiling joists and roof rafters; below and above grade construction; and exterior sheathing, fiberglass insulation between studs, and gypsum interior board.

FIG. 2 (PRIOR ART) is cross section of an example of prior art wall and ceilings, below grade, and above grade construction. In this example, cavity insulation is provided between 2×12 nominal roof rafters 25a for cathedral ceiling, and 2×6 nominal wall studs 24a. While 2×6 roof rafters are structurally sufficient for most roofs, builders often must use 2×12 rafters to provide space for additional cavity insulation to meet insulation requirements. Space is typically preserved above the cavity insulation to permit airflow 31 from soffit vents 32 to a roof vent. A layer of rigid foam sheathing 29, typically extruded or expanded Polystyrene or polyisocyanurate, is installed below the rafters of the cathedral ceiling. Furring strips 28 are installed on the rigid foam sheathing on 24" centers, to support gypsum sheathing 26, which is painted. The building exterior 40 and interior space 60 are shown. For cathedral ceiling, total R-value is R52, using 15.5" of space.

Wall construction is typically 2"×6" studs 24a above grade. While 2"×4" studs are structurally sufficient for most walls, but builders often must use 2"×6" studs to provide space for additional cavity insulation to achieve an overall R20 value. Optional rigid insulation 23, and exterior cladding 34, such as siding or stucco, are applied to the exterior faces of the wall studs 24a. Wall cavity insulation is installed between the wall studs 24a. Gypsum board 26 is applied to the interior of the studs 24a, finished and painted.

Below grade, or basement construction typically includes concrete or CMU walls 35, damp proofing 36, 2" thick R10-R13 rigid foam sheathing 29, typically extruded or expanded Polystyrene or polyisocyanurate, and 2"×4" wall studs 24c, with optional cavity insulation. Gypsum board 26 is applied to the interior of the wall studs and on the ceiling, finished and painted. The grade 43 is away from the building, and drainage fill 42 is provided.

There are several disadvantages to this prior art construction practice. Larger framing lumber than structurally necessary is often used for walls and cathedral ceilings in order to provide more space for a relatively low R-value wall cavity insulation. The larger wall and ceiling cavity spaces and wall cavity insulation inhibit the drying of moisture and can promote mold growth. Neither wall cavity insulation nor gypsum board is effective in preventing thermal bridging through wall studs and ceiling rafters, which results in lower insulation for the building. Multiple trades are typically used to install wall cavity insulation, rigid foam board, gypsum board, tape and float finish and painting of gypsum board walls and ceilings.

With current practices, the insulation is typically installed inside the wall cavity, such as fiberglass, cellulose, batt or blown, and in some cases, sprayed foam. Typical insulation in single family homes or multifamily is fiberglass or cellulose. Insulation thickness is limited by stud size, which is typically 2×4 (3½") studs, making the wall cavity 3.5" wide, typically filled with insulation such as fiberglass, or cellulose, limiting insulation value to R13, with a R Value for 2×4 wall studs of R4.38.

In order to increase the wall R Value, 2×6 wall studs with 5½" actual width is often used. Increasing wall thickness from 2×4" to 2×6" studs substantially increases the cost of framing lumber. The current cost of 2×6" studs is twice the cost for 2×4" studs. This practice uses additional resources of lumber and energy for transportation and requires more onsite staging space.

Insulating with fiberglass, rock wool, or cellulose, can cause health issues, such as respiratory problems, eye and skin irritation for installers and occupants. Current practices with insulation blown and batt insulation inside the wall cavity allow for air leaks which decrease effective R Value. The wall cavity can be partially or fully filled with foam sprayed insulation, which has R Value of R6.5 per inch, however, this practice is very expensive, and it has been a controversial regarding potential adverse health effects due to outgassing in the curing process, and therefore it is not commonly used.

Insulated Wallboard

Figure 3:
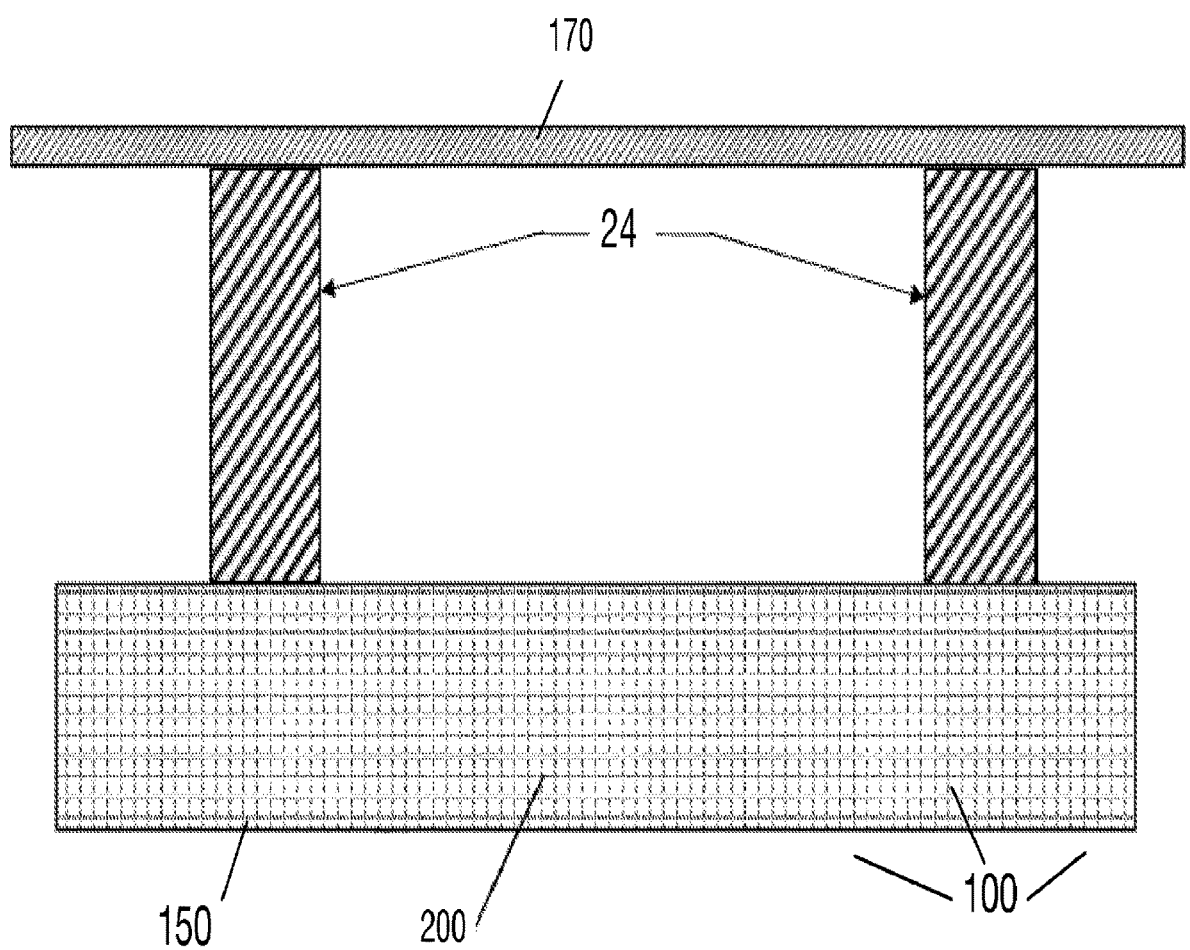
FIG. 3 shows an example insulated wallboard with an enhanced surface.

In one example, insulated wallboard (IW) comprises a 1" to 4" thick insulating core and a interior surface finish support layer. FIG. 3 shows an example insulated wallboard 100 with 2" thick phenolic core 200 with an enhanced surface 150. In order for insulated wallboard to be used exposed, it must pass codes such as ASTM E84, and NFPA286 standards in the US. Expanded polystyrene and XPS do not pass these tests, so they do not meet fire code to be used as exposed IW. Polyiso and Phenolic foam boards pass both tests and meet fire code to be used exposed as IW. Per some reports, Polyiso has toxic gases, especially when it burns, so with current technology it is not suitable for IW, but it is possible to develop a Polyiso that can be used. In order to minimize required thickness, the insulating core preferably has an R6 or greater.

Figure 4:
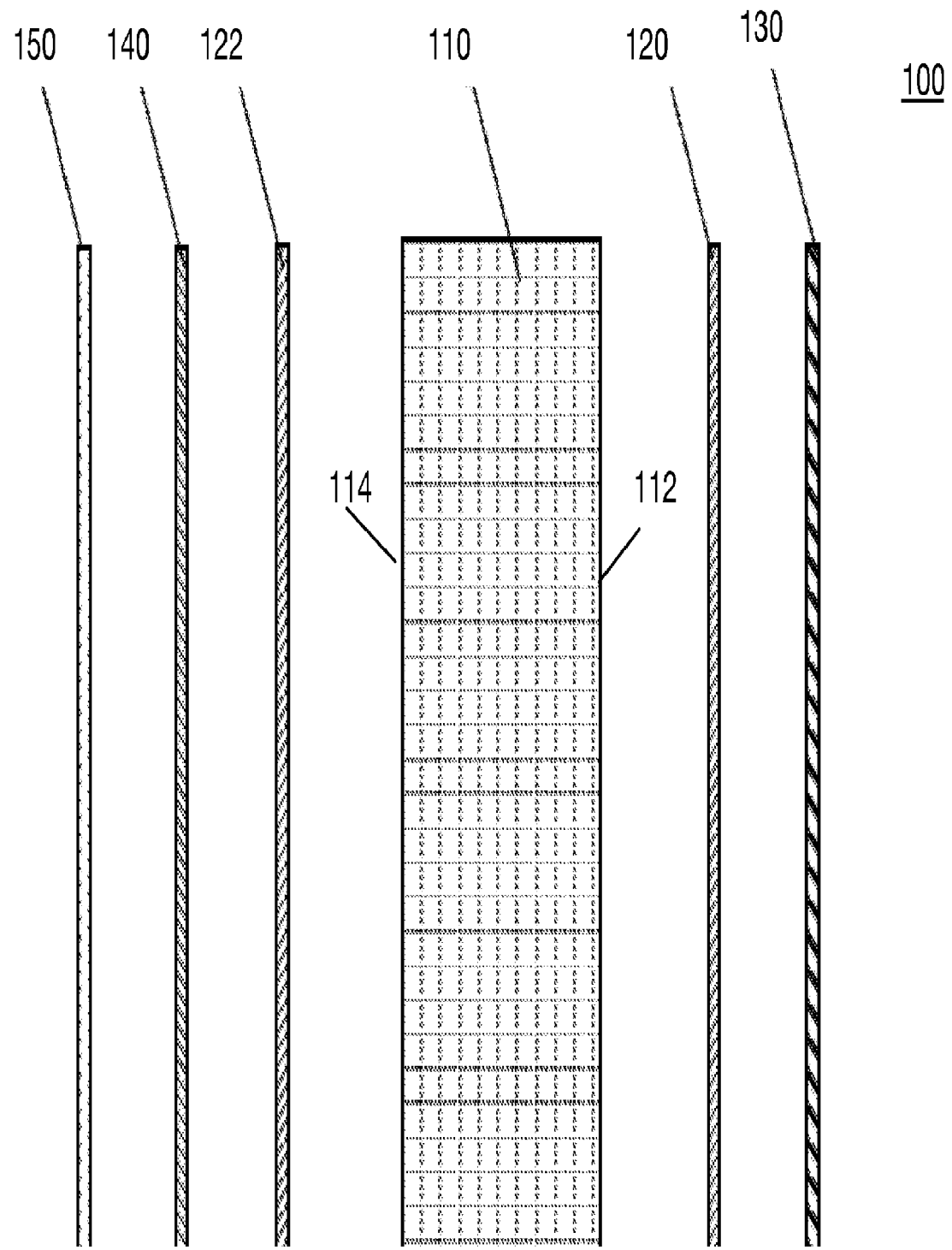
FIG. 4 is an exploded cross section view of an example insulated wallboard showing optional layers over an insulating core.

FIG. 4 is an exploded cross section view of an example insulated wallboard 100 showing an insulating core and several optional layers. In this example, the core of the insulated wallboard 100 is an insulating sheet 110. In one example, a fire retardant phenolic sheathing, 300 Kpa (43.5 psi), thickness 1"-4" is used as the insulating sheet core 110 of the insulated wallboard 100. The insulating sheet 110 has a stud cavity side, or exterior-facing side 112 and an interior side 114. Phenolic has superior fire resistance, with a very low flame spread and very low levels of toxic gas emission. Phenolic foam sheathing is rated with an ASTM E84 25/50 Class A flame and smoke rating, meaning that flame and smoke spread will not exceed 25 feet and 50 feet, respectively, if the insulation ignites. In this specification, the term "fire retardant" sheathing means that the sheathing assembly can meet the ASTM E84 25/50 criteria, and NFPA 285, or other national or local code requirements.

In various examples, the sheathing material may be inherently fire retardant; or may have additives to improve its fire retardant properties; or the sheathing may be a composite assembly of two or more layers, and which includes at least one fire retardant layer.

A cavity side thermal reflection layer 130, such as 7-60 micron thick aluminum foil may be provided. In some examples, a cavity side sheet cover layer 120 may be applied to the cavity side 112 of the insulating sheet 110 in order to improve bonding between the insulating sheet core 110 and the thermal reflection layer.

An interior side sheet cover 122 may be applied to the interior side 114 of the insulating sheet 110. In one example, the cavity side sheet facing 120 and the interior side sheet facing 122 is the same material, such as a non-woven fabric which is laminated or otherwise adhered to the insulating sheet 110 in order to laminate a foil layer to the insulating sheet. An interior side thermal reflection layer 140, such as 7-60 micron thick aluminum foil may be provided. An enhanced surface layer 150, such as fiberglass mesh, 0.2 mm×0.2 mm, or other enhanced surface or treatment is applied over the interior side thermal insulation layer 140 in order to provide a surface for texture, paint or other interior surface finish. In some examples, a fiberglass mesh may be laminated, fused or glued to the internal facer, or laminated, fused on the interior face of the insulating core.

In one example, the cavity side sheet cover 120 and the thermal insulation layer 130 are assembled prior to laminating them to insulating sheet 110; and the interior side sheet cover 122, the interior side thermal insulation layer 140, and the enhanced surface layer 150 are assembled prior to adhering them to the insulating sheet 110. In other examples, an enhanced surface may be created by post-processing processing such as chemical or mechanical treatment of the interior surface of the insulated wallboard.

In one example, the insulated wallboard 100 is provided in panels that are 8 feet long and 4 feet wide.

Figure 5:
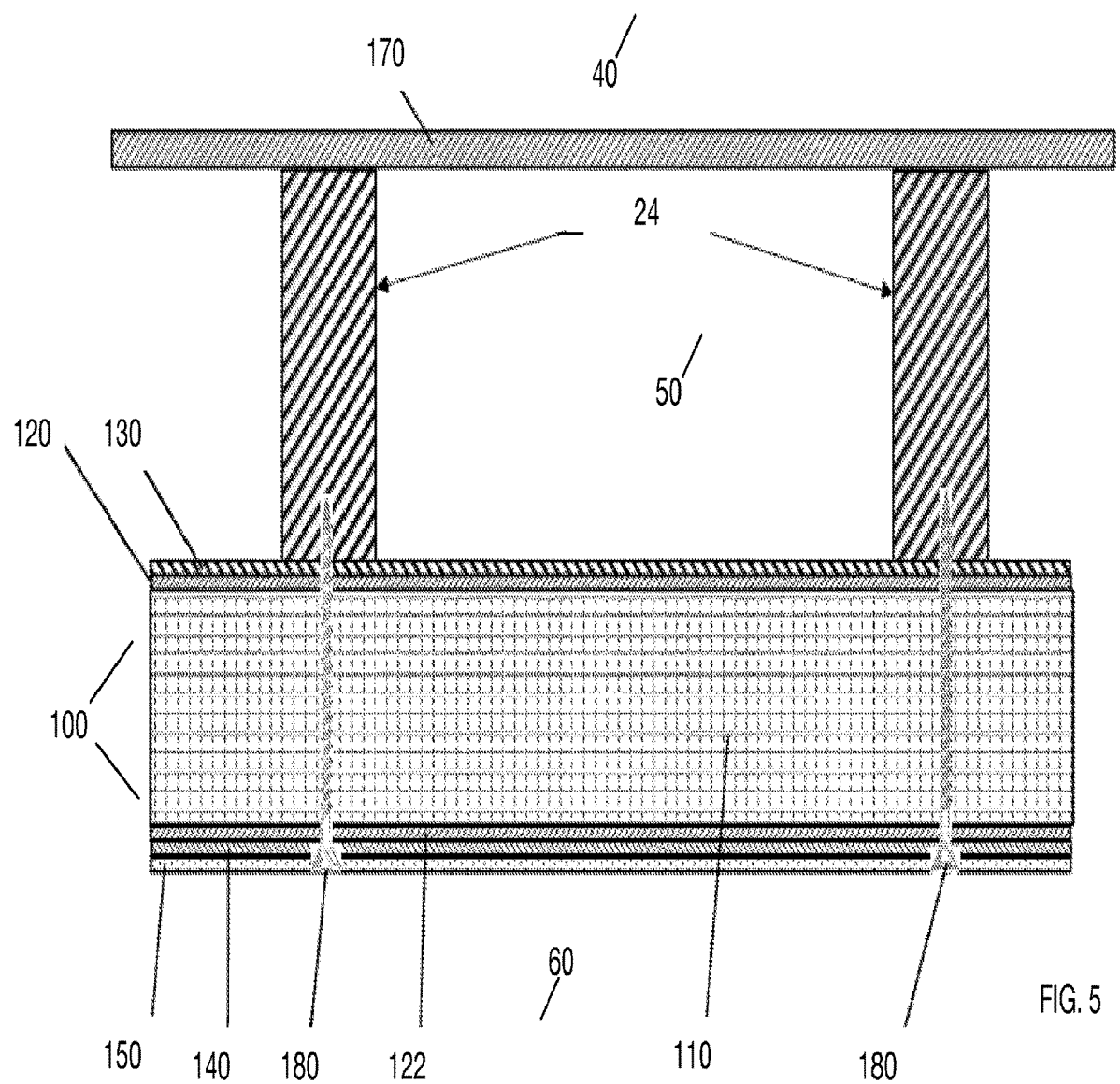
FIG. 5 is a top cross section view of the example insulated wallboard of FIG. 4 applied to building studs.

FIG. 5 is a top cross section view of the example insulated wallboard 100 of FIG. 4 applied to spaced-apart building studs 24 of an exterior wall. In this example, exterior sheathing 170 is applied to the exterior face of studs 24. In this example, the insulated wallboard 100 is secured to the studs 24 with fasteners 180. No insulation is provided in the air gap 50 between the studs.

Panel Edge Profiles

In order to provide a smooth interior surface finish, it is desirable to align and conceal abutting panel edges. Example edge treatment methods include tapered edges, tongue and groove edges, offset edges, and post-installation recessing and taping. Traditionally, overlapping edges and tongue and groove edges increase the strength of the joint and allow two flat pieces to be joined strongly together to make a single flat surface.

Figure 6:
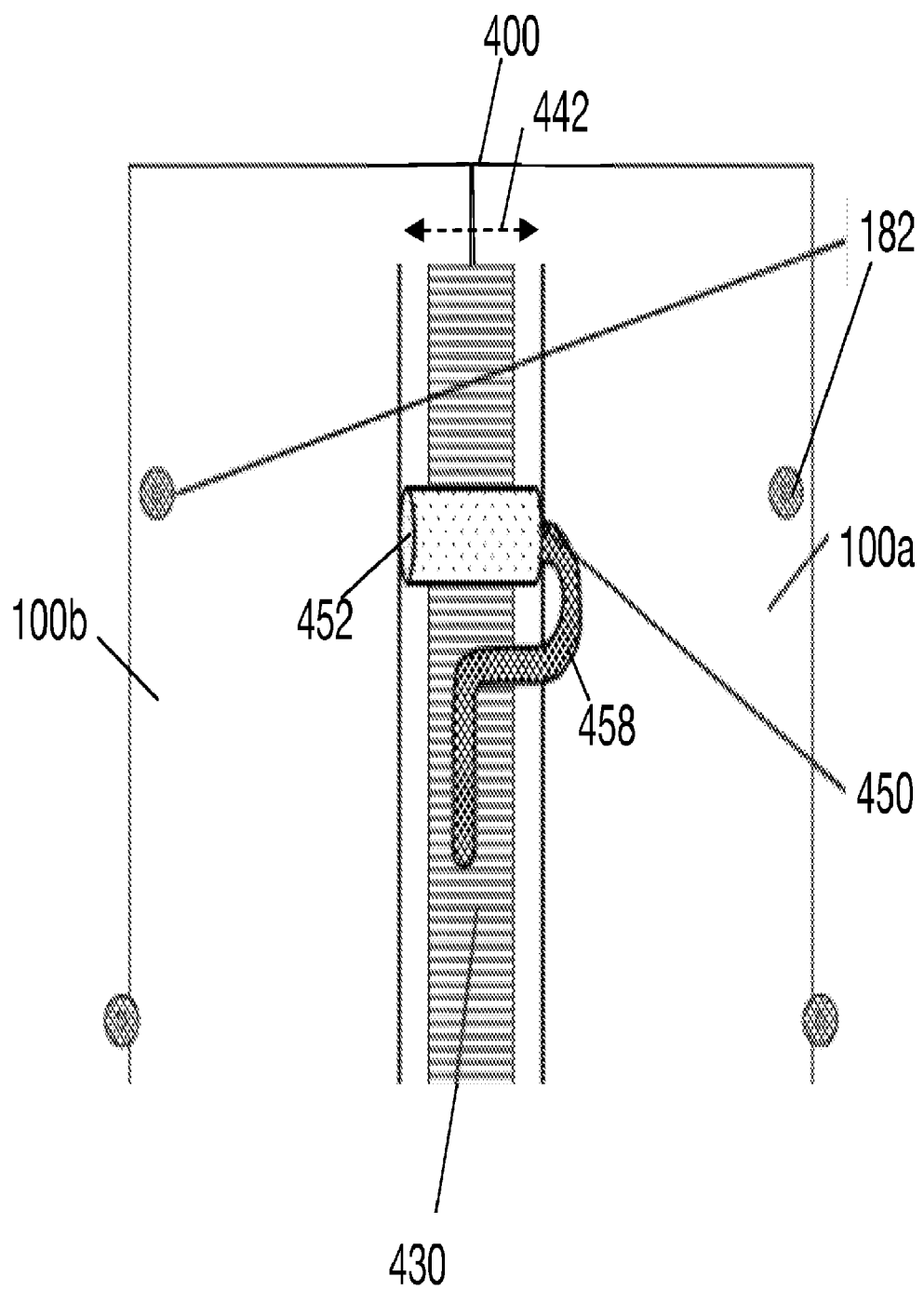
FIG. 6 is a front view of a method of creating a recessed trough between abutting wallboard panels, and applying a tape within the recessed trough.

A tapered or recessed edge can also be created with a J-Roller over the aluminum tape, by depressing the insulating core below the surface. The taper may be ⅛"-3/16" recessed from the surface, and about 3-14" wide. FIG. 6 is a front view of a method of applying a tape over the joint of abutting panels and creating a recessed trough between the panels.

Figure 7A:
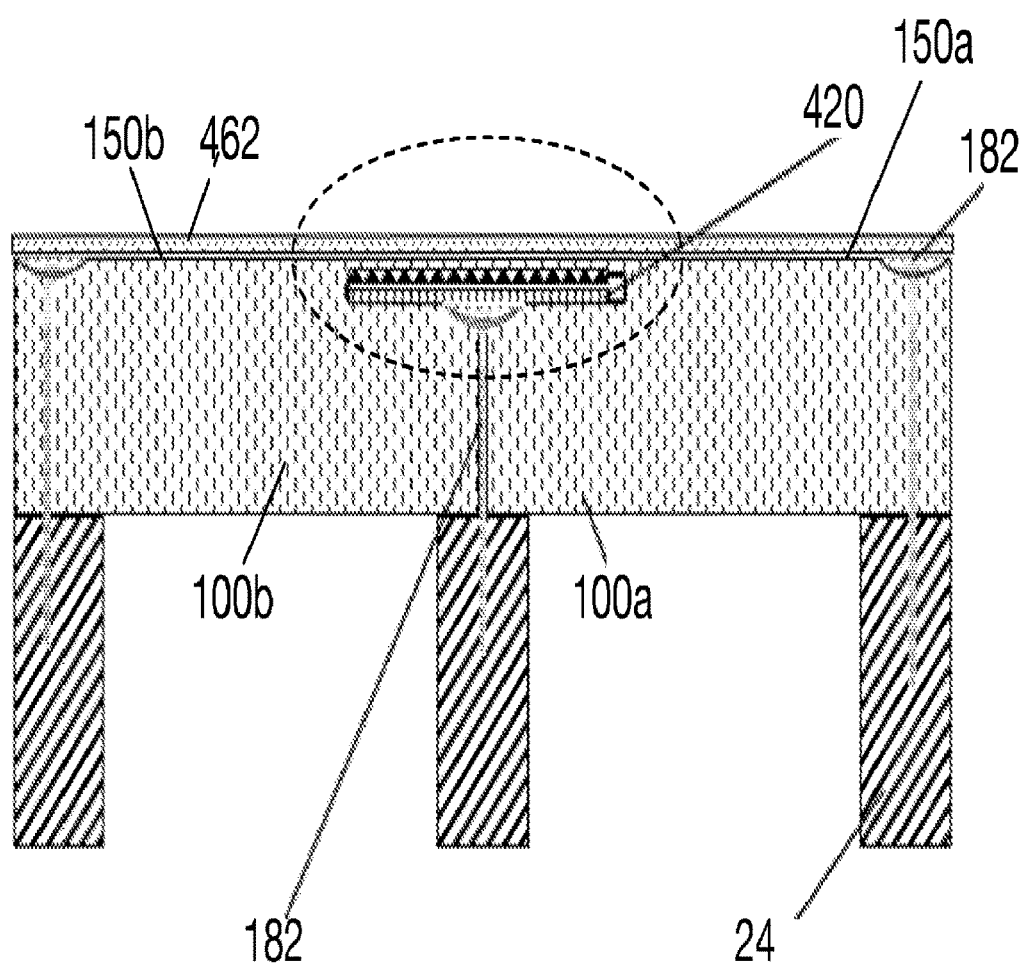
FIG. 7A is a cross section view of the joint of FIG. 6.
Figure 7B:
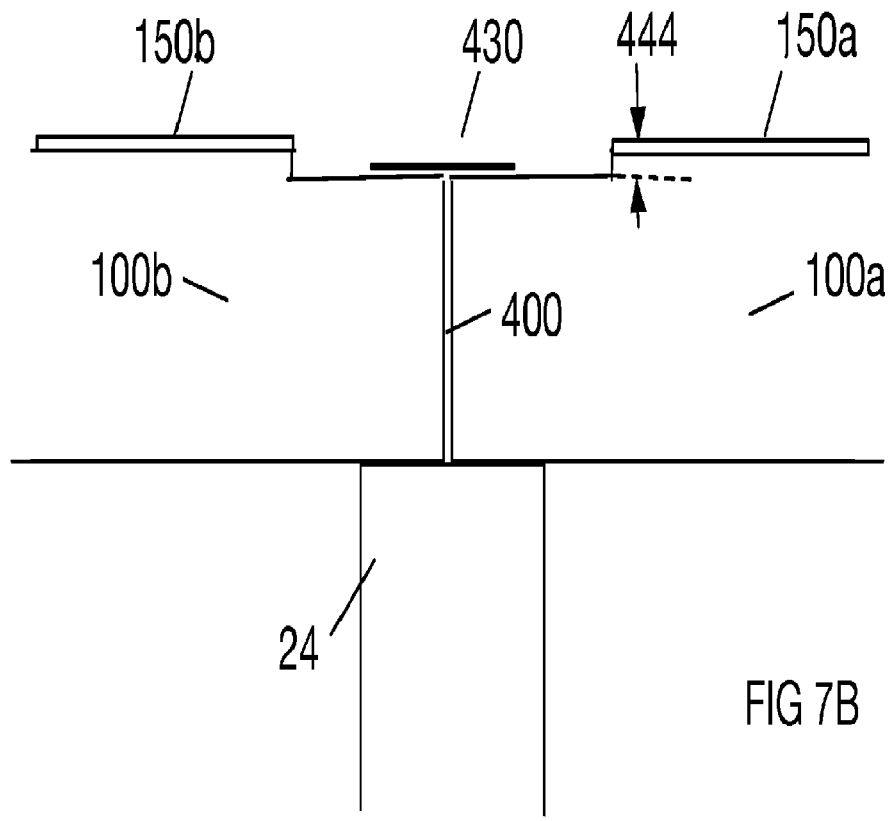
FIG. 7B is a detailed cross section view of aluminum tape applied to the joint of FIG. 7A.
Figure 7C:
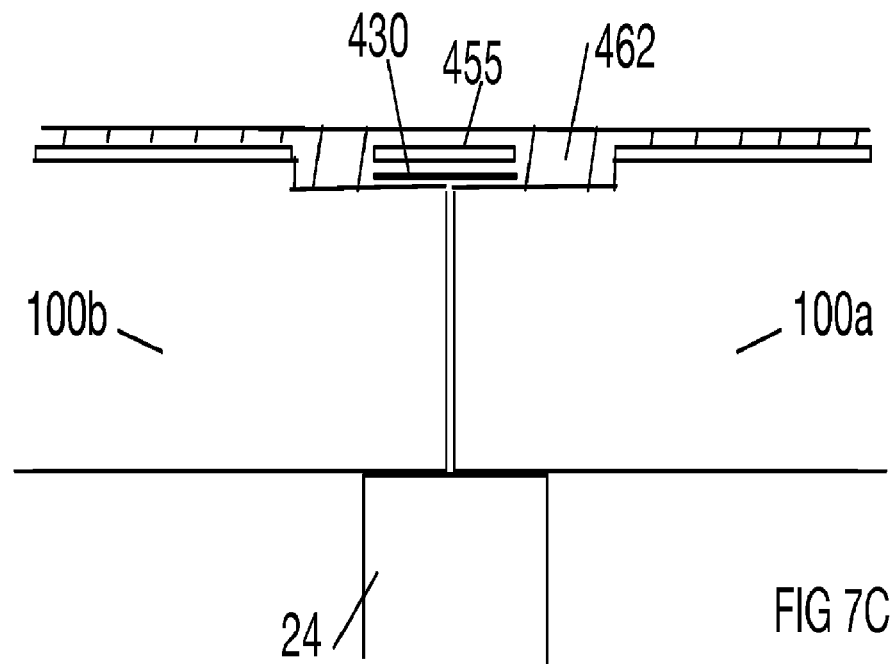
FIG. 7C is a detailed cross section view of fiberglass tape and joint compound applied to the joint of FIG. 7A.

FIG. 7A is a cross section view of the joint 400 of FIG. 6 between a first insulated sheathing 100a and a second insulated sheathing 100b. FIG. 7B is a detailed cross section view of aluminum tape applied to the joint 400 of FIG. 7A. FIG. 7C is a detailed cross section view of fiberglass tape and joint compound 462 applied to the joint 400 of FIG. 7A. In this example, both panels have an interior facing aluminum foil layer 242 with a enhanced surface layer 150. Aluminum tape 430 is applied to the joint 400, and a hard J-roller 450 having a handle 458 and a roller portion 452 is used to create a compressed trough 440 along the joint. The width 442 of the trough is greater than the tape width 432 so that the tape is compressed below the plane 410 of the panels. In one example, the depth of the trough 444 is in the range of 3-16"-⅛" inch. Joint tape 460, such as FibaFuse™ fiberglass tape by Saint Gobain, can be applied on top of aluminum tape to provide better joint compound adhesion. Additional fiberglass, or mesh, or paper joint tape may be applied over the aluminum tape. A paper joint tape is discouraged in order to have a paper free system. Joint compound can be applied over the enhanced surface layer and over the aluminum and fiberglass tapes.

Figure 8:
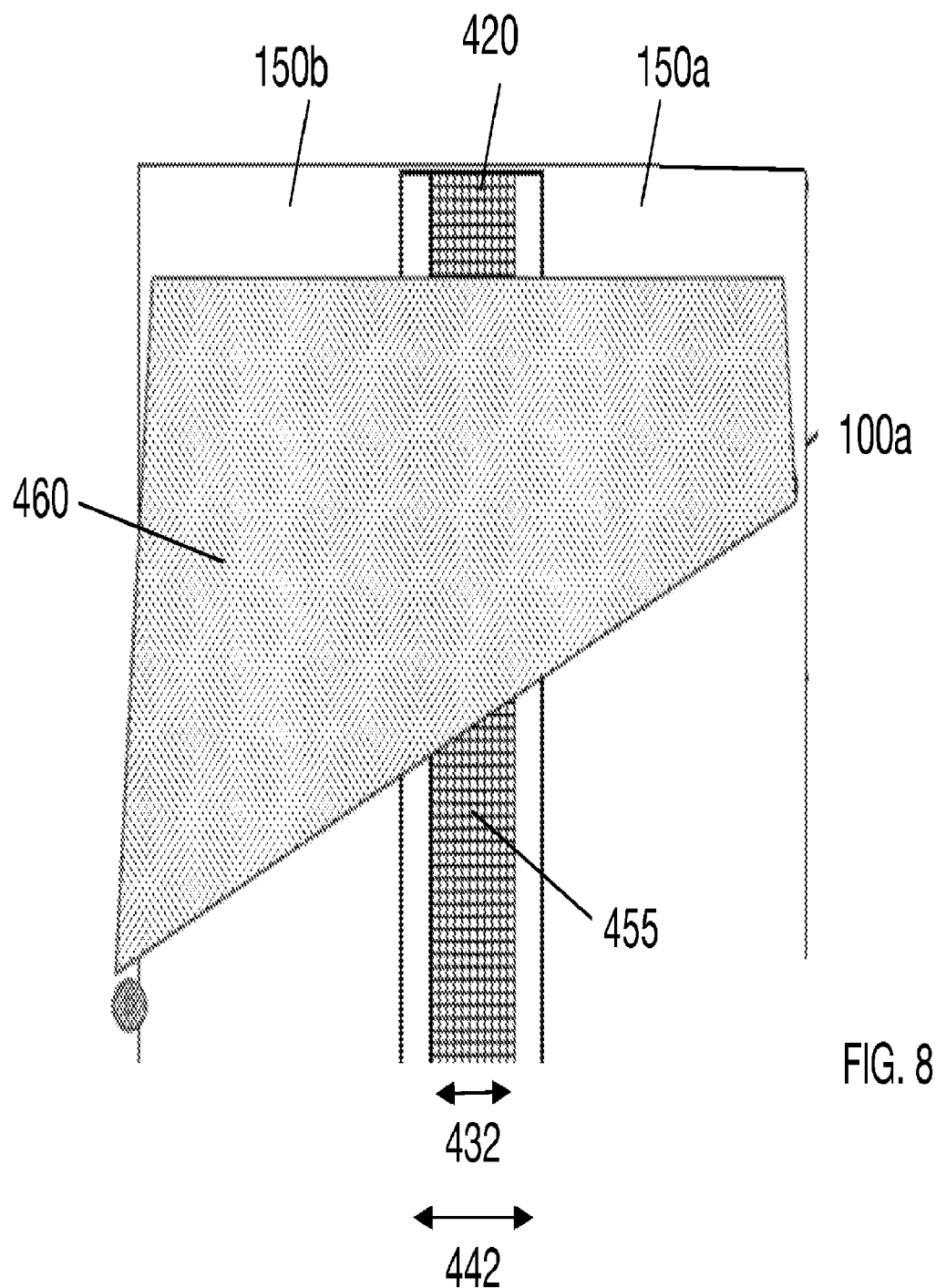
FIG. 8 is a front view of the joint of FIG. 6 showing a layer of joint compound applied over a recessed taped joint.

FIG. 8 is a front view of the joint of FIG. 6 showing a layer 460 of joint compound applied over the enhanced surface 150a and 150b, and over the treated joint 420. In this example, the layer of joint compound conceals the joint without creating a raised portion over the tape, so that sanding of the appearance of the joint may be minimized or eliminated. A final surface treatment, such as paint, plaster, texture and paint, or wallpaper may be applied over the joint compound. One advantage of this joint treatment method is that it can be used at any orientation including vertical joints, horizontal joints, angled joints, and irregular-shaped joints. Prior art drywall typically provides a beveled edge on the long edges, but not on the shorter edges.

Generally speaking, insulated wallboard joints, fasteners, beads, trims, should be finished as smoothly as possibly to minimize sanding. However, light sanding is typically necessary. If sanded is needed, using 150-grit or finer sandpaper, using a hand sander, or a sander with a vacuum cleaner to reduce airborne dust. Apply texture or paint based on the finish desired. Due to non-absorbent properties of insulated wallboard, latex paint has more coverage area compared to drywall.

Insulated Wallboard Examples

FIG. 4 is an exploded cross section view of an example insulated wallboard showing optional layers over an insulating core. In some examples, a fire-retardant layer 216 is extruded with or laminated to the insulating core. In other examples, an interior-facing layer such as paper-fiberglass-mat facing or another surface suitable for finishes, is applied to the interior side of the Insulated Sheathing. In some cases, a thermal reflection layer is applied to the interior side of the insulating core. The thermal reflection layer is in the form of foil, thermal coating or both. In other examples, a reinforcing layer, such as a laminate is provided between the paper, or fiberglass-mat facing and the insulated core is provided in order to improve resistance to compression of the insulated sheathing.

The embodiments described above can be applied on walls or ceilings.

Figure 9:
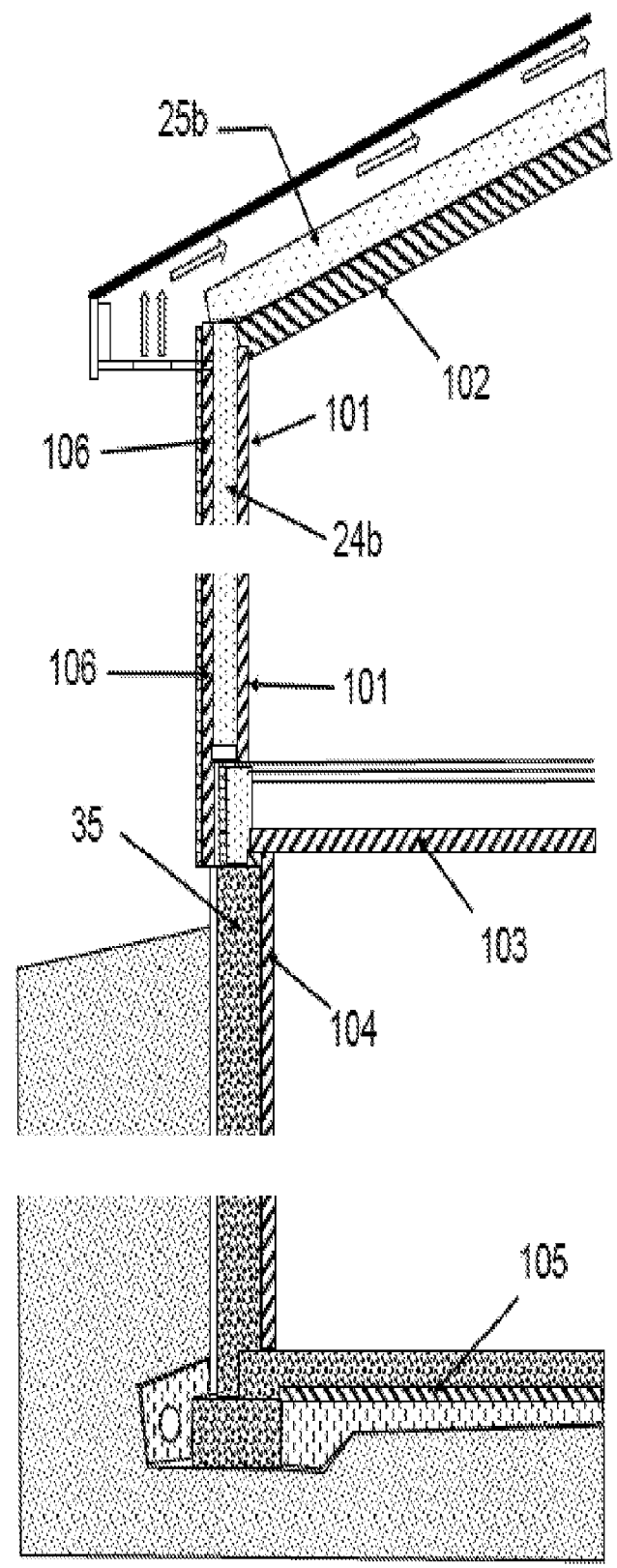
FIG. 9 is a cross section showing an example construction with insulated wallboard on walls and ceilings.

FIG. 9 is a cross section showing an example construction, based on FIG. 2, with insulated wallboard on walls, and ceilings. In this example, an insulated wallboard 100 is applied on multiple surfaces. In this example, a 2" thick phenolic insulated wallboard 101 is applied to 2×4" walls 24b, to provide R17, with total wall insulation R30. This is higher R-value relative to the R20 for the 2×6 wall 24a with cavity insulation in FIG. 2, saving construction cost, and providing 1.5" of additional interior space. A 4" thick phenolic insulated wallboard 102 is applied to 2×6 roof rafters 25b of the cathedral ceiling, to provide R34, with total ceiling insulation R54, with 9.5" of used space. This is higher R-value, with less space, and for lower cost, and less resources used, comparing to 2×12 rafters 25a of FIG. 2, which has R52 for 15.5" of space. In this example, the insulated wallboard has a phenolic core with an R-value of R8.5 per inch. By using a thicker insulated wallboard, smaller framing lumber can be used on the walls and ceilings, and wall cavity insulation can be reduced or eliminated. Since the insulated wallboard has enhanced surface for finishes, such as paint and joint compound, the furring strips and gypsum board are not necessary.

A portion of the wall cavity insulation can be eliminated, down to R13 from R20, and by applying 1" thick R8.5 per inch, the total wall insulation is R21.5, combining wall cavity insulation and insulated wallboard 101. The insulated wallboard permits wall framing studs to be 2×4 rather than 2×6 studs with equal or higher total R-value. Insulated wallboard 101 is painted, eliminating gypsum board. In addition to lower lumber cost, the smaller studs and elimination of gypsum board, an additional 1.5" of interior space is provided.

A 3.25" thick phenolic insulated wallboard 104 with R35 is applied directly to the tilt-up concrete walls below grade 35. Insulated wallboard is painted, eliminating framed 2×4 wall 24c and gypsum sheathing, saving approximately 4" of space.

A 2" thick phenolic insulated wallboard 103 is applied to joists or trusses to form a basement ceiling. A 2" insulated wallboard 105 may be installed under foundations. A 1" insulated wallboard 106 may also be installed as optional exterior insulation.

The current practices for retrofit insulation in existing buildings, as recommended by US DOE are to either to drill numerous 3" holes in exterior sheathing and blow insulation and repairing or installing new exterior cladding, or to add R5 Insulative Sheathing and reinstalling exterior cladding.

Besides high retrofit cost, these methods often make any leaks in the building enclosure become a mold problem due to increased thermal resistance of the wall and lack air flow of drying of the wall cavity. In addition, drilling holes, and replacing siding adds significant cost. Retrofit cavity insulation has limited R Value due to wall thickness and R5 for insulative sheathing underneath the siding.

Embodiments of the present invention are suitable for retrofit insulation for existing buildings without disturbing the exterior of the building or adding insulation inside the wall cavity.

In other examples, insulated wallboard may be applied over existing drywall on walls, or ceilings such as flat or cathedral ceiling to retrofit additional building insulation without removing exterior cladding, roof shingles, and without cutting numerous holes for blowing retrofit insulation into wall cavity, and repairing the numerous holes afterwards.

Figure 10:
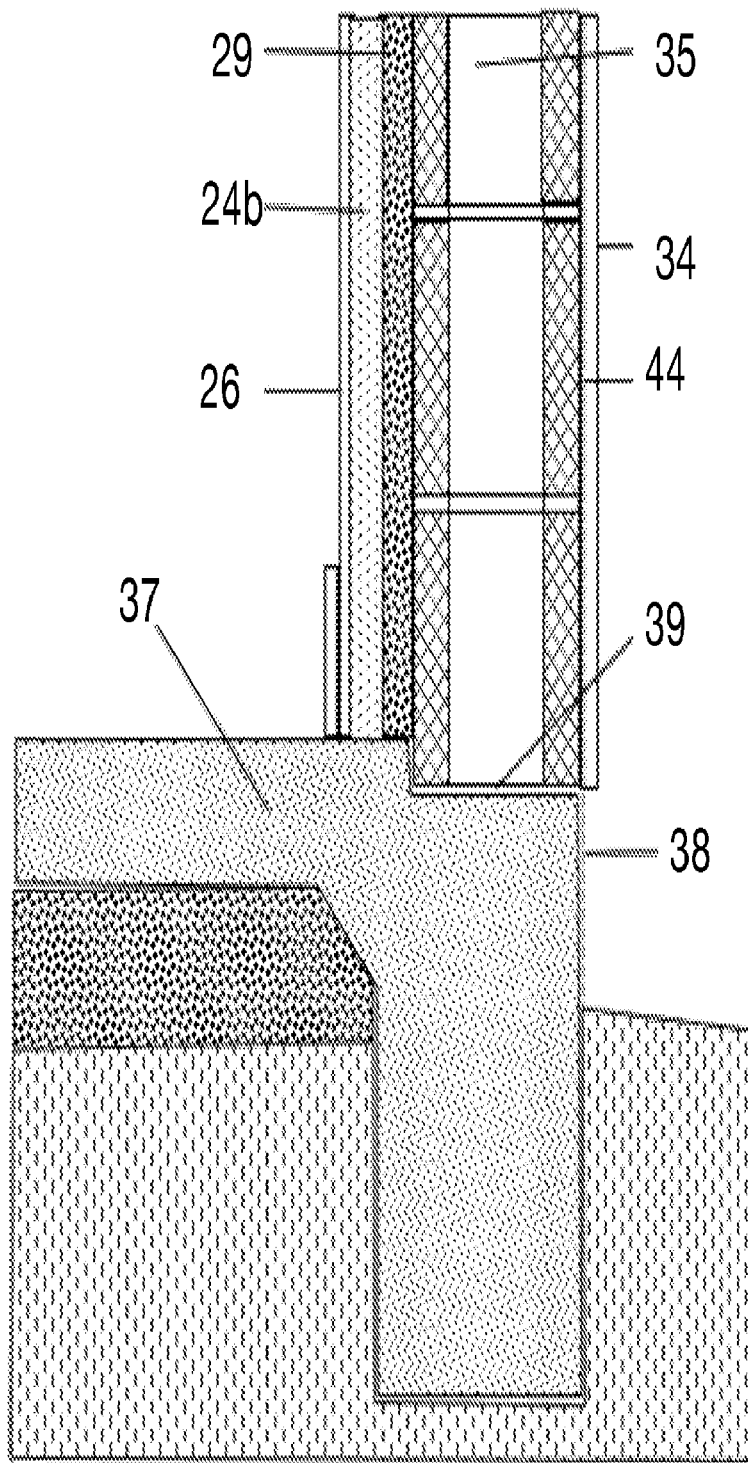
FIG. 10 (PRIOR ART) is a cross section detail of an example prior art CMU, concrete wall, or other masonry construction showing gypsum board over rigid insulation.

FIG. 10 (PRIOR ART) is a cross section detail of an example prior art CMU, concrete tilt-up wall, or other masonry construction 35, installed over a slab depression 39, showing gypsum sheathing 26 over 2×4 framed wall 24b over rigid insulation 29. Interior construction applies a rigid insulation board 29 to the CMU 35, and then applies gypsum sheathing 26 over framed wall 24b. A fluid membrane 44 is applied to the exterior faces of the CMU, and stucco 34 is applied over the fluid membrane. An acrylic latex paint 38 is applied to exterior exposed concrete slab 37

Figure 11:
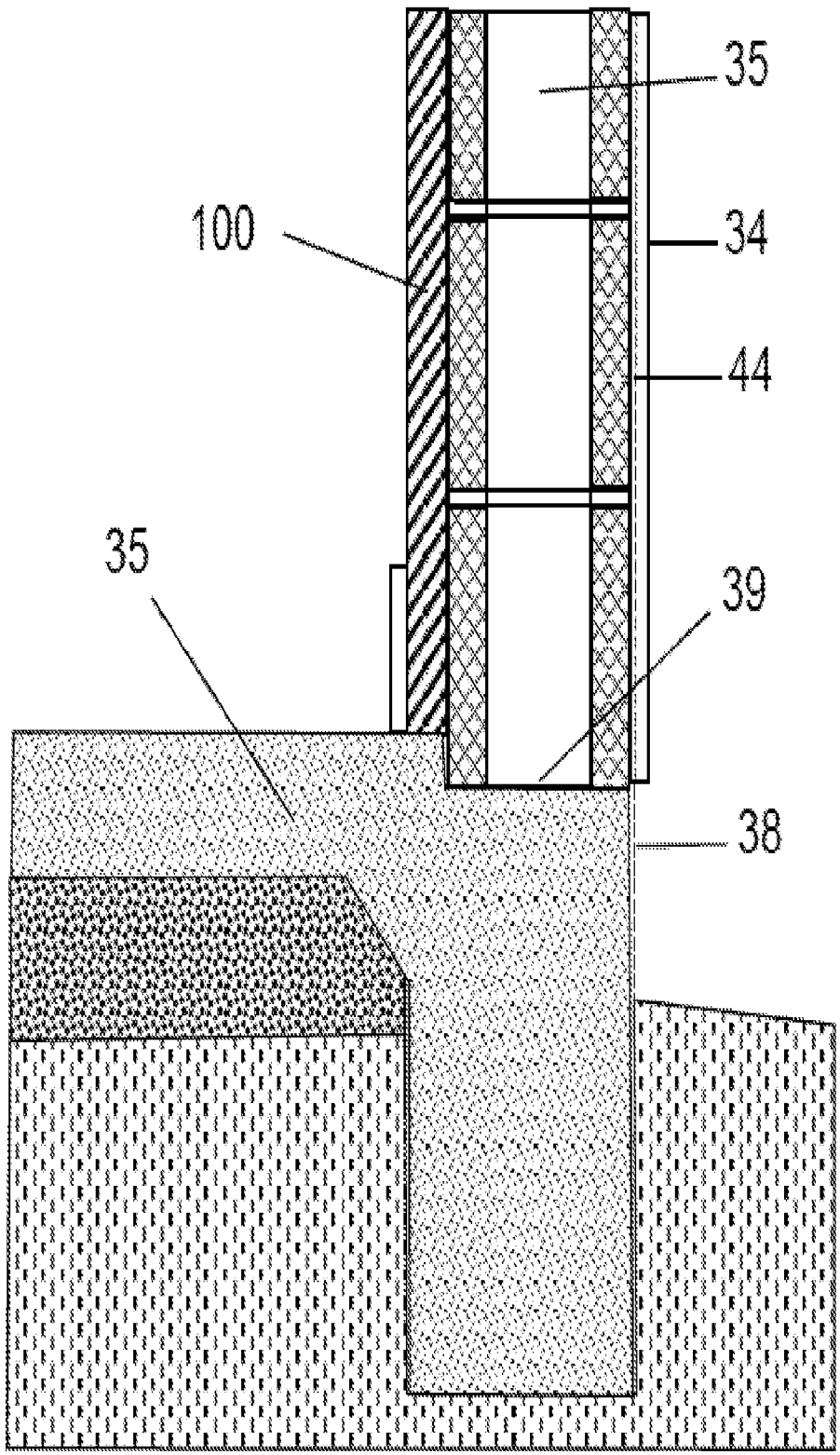
FIG. 11 is a cross section of insulated wallboard applied to CMU, concrete wall, or other masonry wall.

FIG. 11 is a cross section of an example insulated wallboard 100, applied directly to a concrete, masonry, or CMU wall 35. Insulated wallboard 100 is painted and finished. This eliminates the framed 2×4 wall 24b and gypsum sheathing 26 of FIG. 10 providing an additional 4" interior space.

The insulated wallboard may be secured by applying an adhesive to walls and ceilings, such as framing members, ceiling joists, CMU walls, tilt-up concrete walls, or other masonry walls and ceilings. Fasteners 180 of FIG. 5, with crown washers 182 of FIG. 7A, may be used on ceilings or walls. Due to increased thickness of Insulated Wallboard relative to gypsum wallboard, additional blocking, or clips at the top wall plate, and inside corners may be necessary. For example, a triple top plate and one to two additional wall studs per interior corner would be desirable. For new construction electrical boxes can be installed projected enough so they are flush with the finish surface. For retrofit, extensions for electrical boxes can be used. Super wide corner beads may be used to accommodate 2" or larger outside corners.

Advantages and Long-Felt Need

The current invention provides many advantages and addresses many long-felt needs over prior art practice.

Current practices teach that if an insulating layer is installed on the interior of the building, such as foam sheathing, then a layer of gypsum sheathing should be installed on the interior side of the insulating layer, as a thermal barrier and as a finish surface for the interior finishes such as paint, texture, wall paper, plaster and other. To add a gypsum sheathing, furring strips or framed wall is needed. This increases the cost of interior insulation beyond cost effectiveness and requires additional space from the interior. In addition, gypsum sheathing is prone to water damage and mold growth, and expensive repairs if remediation is needed. Eliminating paper faced gypsum sheathing with a product which is resistant to water damage and mold growth, would save billions of dollars a year in remediation cost.

There is a need for a single interior insulating layer which can serve as exposed wallboard in occupiable areas, and finished with interior finishes, without adding a layer of furring strips or framed wall with gypsum board, on the interior side of the insulated layer. There are multiple advantages to added insulation at the affordable cost. The insulated wallboard of the present invention can be left exposed in occupiable areas, and can be enhanced by joint compound, texture and paint. This is of particular advantage in applications where adding insulated layer on the interior is the most cost-effective solution, such as concrete or CMU walls, cathedral ceilings, and exterior walls.

There is a need to eliminate construction products prone to water damage and mold growth such as paper faced gypsum sheathing. During natural events, such as rain, or wind-blowing rain, or due to plumbing leaks, water may be deposited in the wall cavity, and on the interior of the building. In addition, high humidity, temperature difference between interior and exterior of the building, can cause condensation, and excessive moisture in the wall cavity. Current requirements for insulation in walls and ceilings, and air-tight building practices, make the drying cycle longer and when the leaks occur, paper faced gypsum frequently develops microbial growth, known as mold, toxic mold, black mold or similar, while gypsum core absorbs water stimulating further mold growth. A huge amount of resources is spent every year on replacing molded drywall, ranging in billions of dollars. It has been a long felt need for the building product to replace gypsum sheathing, with a products that are not water absorbent like gypsum and paper, and do not contain cellulose-based materials such as paper. The insulated wallboard of the present invention is not water absorbent and does not contain cellulose-based materials. It is highly resistant to microbial growth and water damage.

There is a need to eliminate the remediation and replacement of the wall cavity insulation, due to water damage. There is a long felt need to reduce the cost of remediation, removal, and replacement of the wall cavity insulation. This typically occurs, in homes and buildings exposed to water leaks within or excessive moisture in the wall cavity, which typically causes water damage and microbial growth on wall cavity insulation. The present invention provides insulation on the interior side, and allows for omitting wall cavity insulation, while maintaining required insulation requirements. While this is an advantage for any building, it is of higher advantage in homes and buildings subject to flooding, such as coastal areas, or areas close to lakes, or other areas exposed to high amount of rainfall.

There is a need to eliminate the use of oversized wall and cathedral ceiling framing members for the purpose of increasing wall cavity insulation. The energy code requires R-value R13-R23 for exterior walls. It has become a common practice to increase framing members from 2"×4", which is 3½" wide studs, with cavity insulation R13 to 2×6", which is 5½" wide studs, with cavity insulation R20. This adds 2 additional inches to wall thickness but adds less than R3.7 per inch of increased wall cavity insulation for frequently used batt insulation. This increases lumber use by 57%, for relatively small insulation (R-value) gain, and adds additional cost of lumber and framing labor. There is a long felt need to save natural resources, such as lumber. The present invention allows for insulating layer installed on the interior of 2×4" framed walls, with higher R-value of the wall assembly then for 2×6" walls with cavity insulation. For example, a 2" insulated wallboard, added on the interior side, provides additional R value of R13-R17, which exceeds the reduced wall cavity insulation when 2×6 wall is replaced by 2×4, without increasing the total wall thickness. The insulation R-value requirements for ceilings per current building code is R30-R60. In case of cathedral ceiling or vaulted ceilings, this requirement forces increased size of roof rafters for cavity insulation. Even if structural requirements call for 2×6", the rafter size is increased to 2×10" or 2×12" to increase R-value with cavity insulation. This can double the size of framing lumber, while still not meeting the R-value requirements. Even with 2×12" rafters, additional insulation is needed to meet building energy code. The present invention allows for reasonable framing lumber size while meeting insulation requirements. For example, with 2×6" roof rafters, adding 2-4 inches of the insulated wallboard on the interior, the ceiling meets the energy code, and saves 50% of lumber, reducing the overall cost of construction, and space.

There is a need to provide cost-effective retrofit of existing buildings to improve thermal insulation. The prior art recommendation for retrofit insulation includes adding wall cavity insulation and exterior insulation. To add wall cavity insulation, it is necessary to drill numerous holes, typically 3" diameter, in existing drywall or exterior cladding and exterior sheathing. To add exterior insulation, removal, re-installation, or replacement of exterior cladding is necessary. All drilled holes need to be repaired, re-cladded, and refinished. This is very expensive. In addition, uninsulated or poorly insulated walls of an existing buildings allow for wall cavity to dry and are somewhat forgiving for poor water management practices, including a lack of weather resistive barrier, and flashing details. When existing uninsulated or poorly insulated buildings are retrofitted with cavity insulation, or exterior insulation, any water management deficiencies are exacerbated, because added cavity and exterior insulation are prolong drying time, of water leaks inside the wall cavity, and stimulating water damage and microbial growth. Before retrofitting insulation on uninsulated or poorly insulated buildings, the water management of the building needs to be bought to current standards for insulated buildings. Changing the water management of the building can include re-skinning and waterproofing and re-cladding the exterior, re-setting and flashing all doors and windows. This is very expensive and out of reach for most building owners. It has been a long felt need to retrofit insulation on existing building, for less cost, without upgrading water management of the building to current standards. The present invention allows for retrofitting existing uninsulated or poorly insulated buildings with insulation on the interior side, without having to bring water management of the building to current standards, because the wall cavity and the exterior of the building can be left as-is, allowing for wall cavity to have shorter drying time. Retrofitting insulation for cathedral ceiling typically requires removing and discarding asphalt shingles, installing thick foam insulation on the roof, and then installing new wood decking on top of the foam and new shingles. Insulated wallboard of present invention is installed and finished on the interior of the ceiling, which is much less expensive.

It is to be understood that the specific embodiments and examples described above are by way of illustration, and not limitation. Various modifications may be made by one of ordinary skill.

What is claimed is:

1. An insulated wallboard comprising a
    phenolic insulating core comprising
        a thickness of 0.5 inch or greater,
        a first face,
        a second face,
        a first side edge, and
        a second side edge;
    the insulated core having an R value of at least R5 per inch; and
    an aluminum foil layer applied to the first face of the insulating core, the foil layer comprising
        an internal face bonded to the first face of the phenolic insulating core, and
        an exposed mechanically-treated external face, such that the mechanically-treated external face alters the external face of the foil to create an enhanced surface configured to accept a paint, paint primer, drywall compound, plaster, wallpaper, or other finish.

2. The insulated wallboard of claim 1 further comprising an exterior facer applied to the second face of the insulating core.

3. The insulated wallboard of claim 2 wherein the exterior facer is an external thermal reflection layer.

4. The insulated wallboard of claim 3 wherein the external thermal reflection layer is an aluminum foil sheet.

5. A construction method comprising
    building an exterior wall or ceiling of an occupiable space with a structural element, the structural element having an exterior face and an interior face;
    providing a plurality of insulated wallboards, each insulated wallboard comprising a
        phenolic insulating core comprising
            a thickness of 0.5 inch or greater,
            a first face,
            a second face,
            a first side edge, and
            a second side edge,
        the insulated core having an R value of at least R5 per inch, and
        an aluminum foil layer applied to the first face of the insulating core, the foil layer comprising
            an internal face bonded to the first face of the phenolic insulating core, and
            an exposed mechanically-treated external face, such that the mechanically-treated external face alters the external face of the foil to create an enhanced surface configured to accept a paint, paint primer, drywall compound, plaster, wallpaper, or other finish;
    securing the plurality of insulated wallboards to the interior face of the structural element such that the enhanced surface of the aluminum foil layer is exposed to the occupiable space; and
    applying a paint, paint primer, drywall compound, plaster, wallpaper, or other finish to the enhanced surface of the aluminum foil layer.

6. The construction method of claim 5 wherein the structural element comprises wood studs, joists, or trusses.

7. The construction method of claim 5 wherein the structural element comprises metal studs or beams.

8. The construction method of claim 5 wherein the structural element comprises a concrete or masonry wall formed from poured concrete, a tilt wall, or a plurality of masonry or concrete masonry units.

9. The construction method of claim 5 further comprising securing the plurality of multilayer wallboards to the interior face of the structural element with adhesive sealant, clips, fasteners, or crown washers.

10. The construction method of claim 5 further comprising
    concealing abutting edges of the plurality of insulated wallboard joints by taping and floating the abutting edges.

11. The construction method of claim 5 wherein securing the plurality of insulated wallboards to the interior face of the structural element further comprises
    securing a plurality of insulated wallboard panels to the interior face of the structural element in a manner that creates a plurality of joints between abutting insulated wallboard panels; and
    concealing the plurality of joints by, for each joint,
        providing a length of a first tape, having a tape thickness and tape width;
        providing a tool having a roller, such as "J-roller" with a width greater than the tape width, and a handle;
        applying the tape along a joint between abutting insulated wallboard panels;
        creating a recessed trough, having the width of the roller, extending along the joint while depressing the tape into recessed trough by rolling the roller over the tape; and
        applying a layer of joint or drywall compound over the recessed trough.

12. The construction method of claim 11 further comprising
    applying a layer of fiberglass or fiberglass mesh tape over the length of the first tape prior to applying a layer of joint or drywall compound.

13. The construction method of claim 5 wherein finishing the interior faces of the plurality of insulated wallboards further comprises
    applying texture to the plurality of insulated wallboards; and painting
    the plurality of insulated wallboards.

14. The construction method of claim 5 wherein securing the plurality of insulated wallboards to the interior face of the structural element further comprises
    securing the plurality of multilayer wallboards over the interior faces of existing drywall walls or ceiling.

* * * * *